United States Patent
Yamamoto et al.

(10) Patent No.: US 6,782,983 B2
(45) Date of Patent: Aug. 31, 2004

(54) FLUID TORQUE TRANSMISSION DEVICE EQUIPPED WITH LOCKUP DEVICE

(75) Inventors: Kozo Yamamoto, Daito (JP); Kazuhiro Yamashita, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/291,732

(22) Filed: Nov. 12, 2002

(65) Prior Publication Data

US 2003/0121744 A1 Jul. 3, 2003

(30) Foreign Application Priority Data

Dec. 27, 2001 (JP) ........................................ 2001-396532

(51) Int. Cl.[7] .............................................. F16H 45/02
(52) U.S. Cl. ...................... 192/3.29; 192/3.28; 192/214
(58) Field of Search ............................. 192/3.28, 3.29, 192/55.61, 214

(56) References Cited

U.S. PATENT DOCUMENTS

| | | | | |
|---|---|---|---|---|
| 4,143,561 A | * | 3/1979 | Melhorn | .................... 192/3.29 |
| 4,173,270 A | * | 11/1979 | Croswhite et al. | ......... 192/3.29 |
| 4,580,668 A | * | 4/1986 | Pickard et al. | ............. 192/3.29 |
| 5,046,591 A | * | 9/1991 | Hageman et al. | .......... 192/3.29 |
| 5,401,213 A | * | 3/1995 | Muchmore et al. | ........... 464/68 |
| 5,558,579 A | * | 9/1996 | Tsuchiya et al. | .............. 464/64 |
| 5,964,329 A | * | 10/1999 | Kawaguchi et al. | ......... 192/3.3 |

* cited by examiner

Primary Examiner—Rodney H. Bonck
(74) Attorney, Agent, or Firm—Shinjyu Global IP Counselors, LLP

(57) ABSTRACT

A torque converter with a lockup damper is provided to improve the vibration damping function. The torque converter 1 has the lockup device 7 for mechanically connecting and disconnecting a front cover 11 and a turbine 22, which includes a clutch mechanism and a damper mechanism. A friction generating mechanism 45 is a mechanism that generates friction resistance when the lockup damper operates, and includes a friction washer 52, which constitutes a friction surface, and a micro twisting angle adjustment gap 56, which is arranged to prevent the friction washer 52 from operating within a range of micro twisting angles.

19 Claims, 6 Drawing Sheets

FLUID TORQUE TRANSMISSION DEVICE EQUIPPED WITH LOCKUP DEVICE

BACKGROUND OF THE INVENTION

1. Field of the Invention

This invention relates to fluid torque transmission devices. More specifically, the present invention relates to fluid torque transmission devices equipped with lockup devices such as torque converters and fluid couplings.

2. Background Information

A torque converter has three types of vane discs (impeller, turbine, and stator) therein to transmit torque via hydraulic oil. The impeller is affixed to a front cover as an input side rotating member. The turbine is placed in the fluid chamber facing the impeller. As the impeller rotates, the hydraulic oil flows to the turbine from the impeller and outputs the torque by means of rotating the turbine.

The lockup device is placed in a space between the turbine and the front cover. The lockup device is a mechanism for directly transmitting the torque from the front cover to the turbine by means of mechanically connecting the front cover with the turbine.

A conventional lockup device normally includes a disk-like piston, a retaining plate, a torsion spring, and a driven plate. The disk-like piston can be pressed against the front cover. The retaining plate is affixed to the outer periphery of the piston. The torsion spring is supported in a rotational direction on the outer periphery by the retaining plate. The driven plate supports both ends of the torsion spring in the rotational direction. The driven plate is affixed to a turbine shell.

When the lockup device engages with the front cover, torque is transmitted from the front cover to the piston, and then to the turbine via the torsion spring. Further, in the elastic connection mechanism of the lockup device, the torsion spring is compressed in the rotational direction between the retaining plate and the driven plate to absorb and dampen twisting vibrations.

There are two kinds of torsion vibration noises, primarily, i.e., running noises (booming noise, etc.) and shock or jerking noises (low frequency vibrations).

The former kind of noises is generated when the rotational variations of the engine are transmitted to the drive train and develop booming sounds in the cabin through the suspension and the mounts. The damper for those noises has to be able to reduce the torsional rigidity to lower the resonance point as much as possible from the lockup region, and to achieve a high damping performance with a low hysteresis torque.

The latter kind of noises, the shock or jerking noises, is generated when the torque is inputted in a step-like manner as a result of stepping on the accelerator pedal abruptly or releasing it abruptly. As a consequence, the car body is shaken back and forth violently in a transient mode. The damper for such a phenomenon is required to have a torsional characteristic of a high hysteresis torque.

Trying to use a low hysteresis torque in order to dampen the booming sound caused by the rotational variations of the engine introduces in turn another problem, i.e., intensification of low frequency vibrations. Moreover, if a friction damping mechanism having multiple plates between the piston and the turbine is installed in the lockup device, it creates the problem of using needed springs in addition to the friction members, thus increasing the number of parts. Additionally, if a damper mechanism similar to a clutch disk assembly used in a clutch device is used, a complex friction damping mechanism is needed. The complex friction damping mechanism has friction members provided between the driven plate and the drive plates on both sides of the mechanism in the axial direction. Furthermore, the complex friction damping mechanism has springs for generating an axially energizing force. The problem here is that springs are needed in addition to the friction members, thus increasing the number of parts. In view of the above, there exists a need for a fluid torque transmission device equipped with lockup device that overcomes the above-mentioned problems in the prior art. This invention addresses this need in the prior art as well as other needs, which will become apparent to those skilled in the art from this disclosure.

SUMMARY OF THE INVENTION

An object of the present invention is to improve the noise damping characteristics of the fluid type torque transmission device equipped with a lockup device by simultaneously damping both the running noises and the shock and/or jerking noises.

Another object of the present invention is to provide a more compact friction damping mechanism in a fluid torque converter equipped with a lockup device.

A fluid torque transmission device equipped with a lockup device in accordance with a first aspect of the present invention has a front cover, an impeller, a turbine, a lockup device, and a friction generating mechanism. The impeller constitutes a fluid chamber together with the front cover. The turbine is arranged to face axially the impeller in the fluid chamber. The lockup device is a mechanism configured for mechanically connecting and disconnecting the front cover from the turbine. The lockup device includes a clutch mechanism and an elastic connection mechanism. The friction generating mechanism is a mechanism for generating friction resistance when the lockup device is in operation. The friction generating mechanism includes a friction surface and a micro gap that prevents the friction surface from operating within a range of small twisting angles.

According to this fluid torque transmission device, the torque of the front cover is mechanically transmitted to the turbine via the lockup device of the front cover when the clutch mechanism of the lockup device is engaged. When twisting vibrations from the front cover are transmitted to the lockup device, the elastic connection mechanism of the lockup device operates to absorb and dampen the twisting vibrations. The friction surface of the friction generating mechanism engages in a rubbing action at this time and generates a specified hysteresis torque.

If the type of the twisting vibration is such that the twisting angle is quite large as in the case of a low frequency vibration, the friction surface engages in a rubbing action and causes a high hysteresis torque. Therefore, the low frequency vibration is quickly attenuated. If the type of the twisting vibration is such that the twisting angle is small as in the case of the engine speed fluctuation, which often causes abnormal sounds during driving, the friction surface does not engage in a rubbing action because of the existence of the micro twisting angle gap. Thus the friction surface does not produce a high hysteresis torque. Therefore, the engine speed fluctuation is sufficiently absorbed and no abnormal sounds occur during driving.

A fluid torque transmission device equipped with a lockup device in accordance with a second aspect of the present invention is the device of the first aspect wherein, the friction generating mechanism is arranged to function in parallel with the elastic connection mechanism of the lockup device between the front cover and the turbine.

In this fluid torque transmission device equipped with a lockup device, the friction generating mechanism is arranged to function in parallel with the elastic connection mechanism. In other words, the friction generating mechanism is provided separate from the elastic connection mechanism making the structure of the lockup device simpler.

A fluid torque transmission device equipped with a lockup device in accordance with a third aspect of the present invention is the device of the second aspect wherein, the turbine includes a turbine shell, multiple turbine blades provided on the impeller side of the turbine shell, and a turbine hub affixed to the inner periphery of the turbine shell. The friction generating mechanism is located in the axial direction between the front cover inner periphery and the turbine hub.

Since the friction generating mechanism is located in an axial direction between the front cover inner periphery and the turbine hub in the fluid torque transmission device, it is possible to make the friction surface abut with other members using the pressure in the fluid chamber. Consequently, it is unnecessary to have a separate member for the purpose of applying load in the friction generating mechanism, thus reducing the number of parts.

A fluid torque transmission device equipped with a lockup device in accordance with a fourth aspect of the present invention is the device of third aspect wherein, the friction generating mechanism has an engagement part that engages with either one of the front cover or the turbine hub across the micro gap in the rotating direction. Further, the friction surface is placed between the engagement part and the other one of the front cover or the turbine hub.

Within the range of the micro gap wherein the engagement part of the friction generating mechanism does not abut against either one of the front cover or the turbine hub in this fluid torque transmission device, the friction surface does not rub against the other one of the front cover or the turbine hub.

A fluid torque transmission device equipped with a lockup device in accordance with a fifth aspect of the present invention is the device according to the fourth aspect that has a thrust bearing placed between the friction generating mechanism and either one of the front cover or the turbine hub.

Since the thrust bearing is placed in the axial direction between the friction generating mechanism and either one of the front cover or the turbine hub in this fluid torque transmission device, the engagement part rotates together with the other one of the front cover or the turbine hub across the friction surface within the micro gap range, in other words, no rubbing occurs on the friction surface. The thrust bearing mentioned here includes those types of bearings having multiple rolling members that carry loads in the axial direction while generating very little friction resistance in the rotational direction.

A fluid torque transmission device equipped with a lockup device in accordance with a sixth aspect of the present invention is the device any one of the first to fourth aspects having a friction generating mechanism, which generates friction smaller than the friction of the friction surface in order to dampen the vibrations of micro twisting angles within the range of micro twisting angles.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

(1) Basic Structure of the Torque Converter

Figure 1:
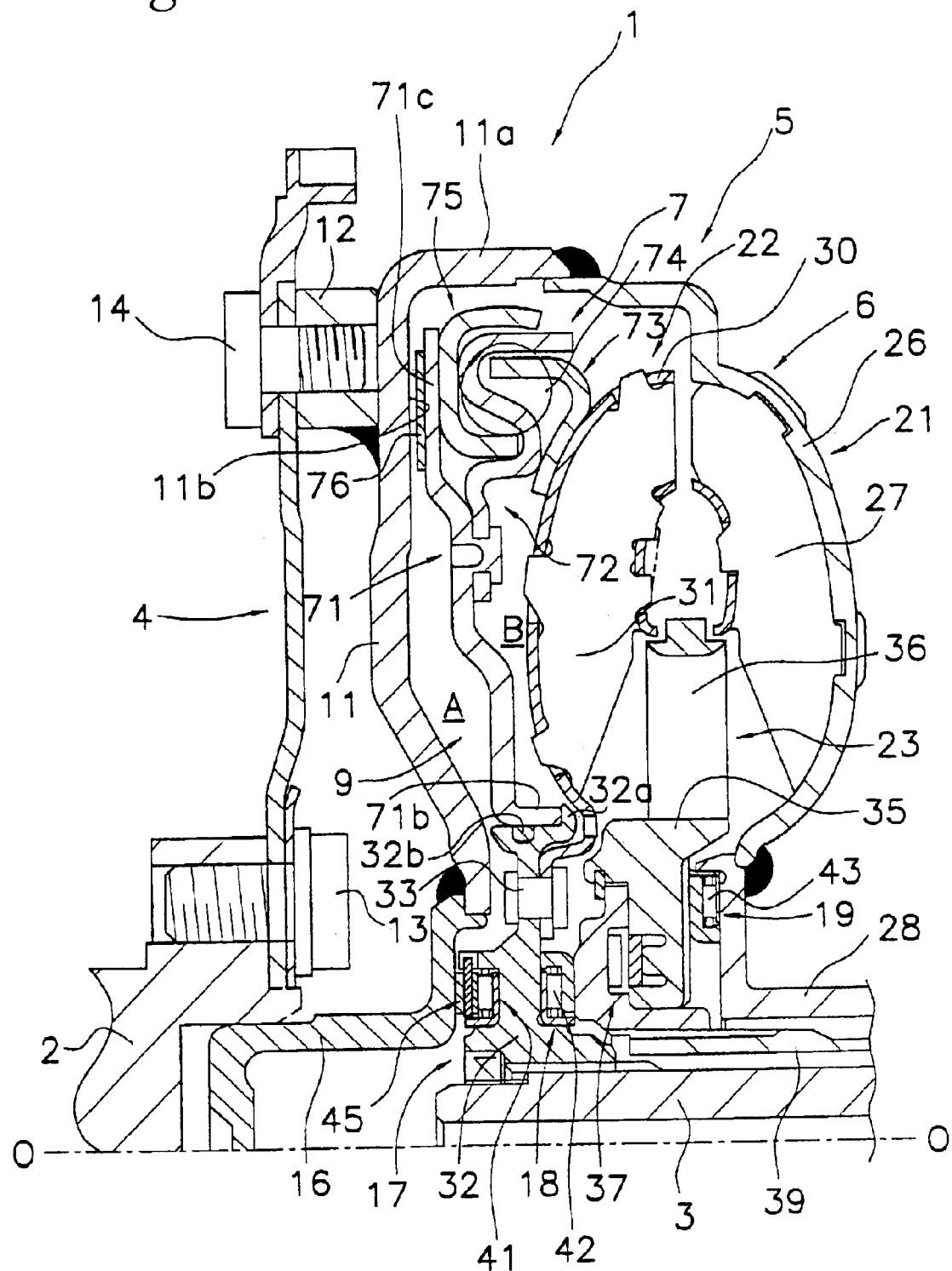
FIG. 1 is a vertical cross-sectional schematic view of a torque converter in accordance with a preferred embodiment of the present invention.

FIG. 1 illustrates a schematic vertical cross-sectional view of the torque converter 1 in accordance with a preferred embodiment of the present invention. The torque converter 1 is a device for transmitting torque of an engine crankshaft 2 to a transmission input shaft 3. The engine (not shown) is located to the left of FIG. 1, and the transmission (not shown) is located to the right of FIG. 1. The line 0—0 shown in FIG. 1 is the axis of rotation of the torque converter 1.

The torque converter 1 includes a flexible plate 4 and a torque converter main body 5. The flexible plate 4 is a member made of a thin disc member that is configured to transmit the torque and to absorb bending vibrations from the crankshaft 2 to the torque converter main body 5. Therefore, while the flexible plate 4 has a sufficient rigidity in the rotation direction for transmitting the torque, its rigidity in the bending direction is low.

The torque converter 1 has a torus-shaped fluid operating chamber 6 made of three types of vane wheels (an impeller 21, the turbine 22, and the stator 23), and the lockup device 7. The torque converter 1 has a front cover 11 axially located between the flexible plate 4 and the vane wheels. The front cover 11 is a circular disk-shape member, which is located adjacent to the flexible plate 4. A center boss 16 is welded to the inner peripheral edge of the front cover 11. The center boss 16 is a cylindrical member. The center boss 16 extends axially such that it is inserted into a center bore of the crankshaft 2. Since the center boss 16 is welded to the front cover 11, it can be considered as a part of the front cover 11 in a broader sense. The center boss 16 can also be unitarily formed as a part of the disk-shaped front cover 11.

The inner periphery of the flexible plate 4 is affixed to the nose face of the crankshaft 2 with multiple bolts 13. Multiple nuts 12 are affixed equally spaced on the circumferential direction on the outer peripheral and engine side of the front cover 11. Bolts 14 that screw into these nuts 12 fasten the outer periphery of the flexible plate 4 to the front cover 11. Thus, a predetermined space is maintained between the front cover 11 and the flexible plate 4.

An outer periphery side cylindrical part 11a is formed on the outer periphery of the front cover 11 to extend axially toward the transmission side. The outer edge of an impeller shell 26 of the impeller 21 is welded to the tip of the outer periphery side cylindrical part 11a. Consequently, the front cover 11 and the impeller 21 together form a fluid chamber that is to be filled with hydraulic oil. The impeller 21 primarily has the impeller shell 26, multiple impeller blades 27 affixed inside thereof, and an impeller hub 28 affixed on the inner periphery of the impeller shell 26.

The turbine 22 is placed axially facing the impeller 21 in the fluid chamber. The turbine 22 primarily has a turbine shell 30, multiple turbine blades 31 affixed on the impeller side thereof, and the turbine hub 32 affixed on the inner periphery of the turbine shell 30. The turbine shell 30 and the turbine hub 32 are fastened together by multiple rivets 33. A spline is formed on the inner periphery of the turbine hub 32 to engage with the input shaft 3. Consequently, the turbine hub 32 rotates together with the input shaft 3.

The stator 23 is a mechanism intended for rectifying the flow of the hydraulic oil that is returning from the turbine 22 to the impeller 21. The stator 23 is a member integrally built by casting from a synthetic resin or aluminum alloy. The stator 23 is placed between the inner periphery of the impeller 21 and the inner periphery of the turbine 22. The stator 23 primarily has an annular stator shell 35 and multiple stator blades 36 provided on the outer periphery of the stator shell 35. The stator shell 35 is supported by a cylindrical fixed shaft 39 via a one-way clutch 37. The fixed shaft 39 extends between the inner periphery of the input shaft 3 and the inner periphery of impeller hub 28.

The shells 26, 30, and 35 of the vane wheels 21, 22, and 23 described above respectively form the torus-shaped fluid operating chamber 6 inside the fluid chamber. An annular space 9 is secured between the front cover 11 and the fluid operating chamber 6 in the fluid chamber. Although the one-way clutch 37 is shown in the drawing as a clutch incorporating a ratchet, those that incorporate rollers or sprags can be used as well.

The first thrust bearing 41 is provided in the axial direction between the inner periphery of the front cover 11, which includes the center boss 16, and the turbine hub 32. A first port 17 is formed at the part where the first thrust bearing 41 is provided in order for the hydraulic oil to be able to communicate radially. The first port 17 is provided to communicate the oil passage provided in the input shaft 3 with a first hydraulic pressure chamber A (to be described later) and the space between the turbine 22 and the front cover 11. Moreover, a friction generating mechanism (to be described later) 45 is provided between the first thrust bearing 41 and the flange of the center boss 16, which, as stated, is a part of the front cover 11.

A second thrust bearing 42 is provided between the turbine hub 32 and the inner periphery of the stator 23. More specifically, in the present embodiment, the second thrust bearing 42 is provided between the turbine hub 32 and the one-way clutch 37. A second port 18 is formed in order for the hydraulic oil to be communicable radially to both sides in the area where the second thrust bearing 42 is placed. In other words, the second port 18 communicates the oil passage between the input shaft 3 and the fixed shaft 39 with the fluid operating chamber 6. Moreover, a third thrust bearing 43 is provided in the axial direction between the stator 23 (more specifically, the shell 35) and the impeller 21 (specifically, the impeller hub 28). A third port 19 is formed in the area where the third thrust bearing 43 is located in order for the hydraulic oil to be able to communicate to both sides radially. In other words, the third port 19 is provided to communicate the oil passage between the fixed shaft 39 and the impeller hub 28 with the fluid operating chamber 6. Each oil passage is connected to a hydraulic circuit (not shown), and is capable of supplying and discharging the hydraulic oil to the first through the third ports 17–19 independently.

The first through third thrust bearings 41–43 are constantly under an axial load due to a hydraulic pressured generated in the fluid chamber.

(2) Structure of the Lockup Device

The lockup device 7 is located in a space 9 between the turbine 22 and the front cover 11 in an axial direction. The lockup device 7 is provided to connect mechanically the turbine 22 and the front cover 11 as needed. The lockup device 7 is generally formed in a disk-like shape and substantially divides the space 9 in the axial direction. The space between the front cover 11 and the lockup device 7 is hereinafter defined as the first hydraulic chamber A, and the space between the lockup device 7 and the turbine 22 as the second hydraulic chamber B. The lockup device 7 has a function of a clutch and an elastic connection mechanism, and is primarily constituted of a piston 71, a drive plate 72, a driven plate 73, multiple torsion springs 74, and a spring holder 75.

The piston 71 is a member for connecting and disconnecting the clutch, but it also serves as an input member for the lockup device 7 and as an elastic connection mechanism. The piston 71 is a disk with a center hole. The piston 71 substantially extends the entire radius of the space 9 substantially splitting the space 9 in an axial direction. An inner periphery side cylindrical part 71b, which extends in the axial direction toward the transmission side, is formed on the inner radial edge of the piston 71. The inner periphery side cylindrical part 71b is supported by the outer circumference of the turbine hub 32 to be able to move rotationally and axially. A flange 32a is formed on the outer periphery of the turbine hub 32 for limiting the axial movement of the piston 71 toward the transmission side by abutting with the inner periphery side the cylindrical part 71b. This forms a seal in the axial direction at the inner radial edge of the piston 71. An annular seal ring 32b is formed on the outer periphery of the turbine hub 32, which abuts with the inner periphery surface of the inner periphery side cylindrical part 71b. Moreover, a friction connecting part 71c is formed on the outer periphery side of the piston 71. The friction connecting part 71c is an annular part that has a certain length in the radial direction, and forms a flat surface perpendicular to the axial direction. An annular friction facing 76 is formed on the engine side in the axial direction of the friction connection part 71c. As can be understood from the above description, the piston 71 and the flat friction surface 11b of the front cover 11 together constitute the clutch of the lockup device 7.

The drive plate 72 is provided on the outer periphery of the piston 71 on the transmission side in the axial direction. The drive plate 72 is a member for supporting the torsion springs 74 in the radial and rotational directions. The torsion springs 74 are coil springs extending in the peripheral direction. The driven plate 73 is a member for transmitting the torque from the torsion springs 74 to the turbine 22. The driven plate 73 is an annular member made of sheet metal, which is provided on the outer periphery side of the turbine shell 30 of the turbine 22. The spring holder 75 is a member for radially supporting the torsion springs 74, and is provided to be able to rotate relative to the drive plate 72 and the driven plate 73. The spring holder 75 also functions as an intermediate floating member for serially connecting a pair of the torsion springs 74 in the rotating direction.

To summarize the above-mentioned constitution, the lockup device 7 primarily is made of a clutch portion (11b and 76) and the torsion springs 74 that act as an elastic connection mechanism, i.e., a torsional vibration damper.

(3) Structure of the Friction Generating Mechanism

Figure 2:
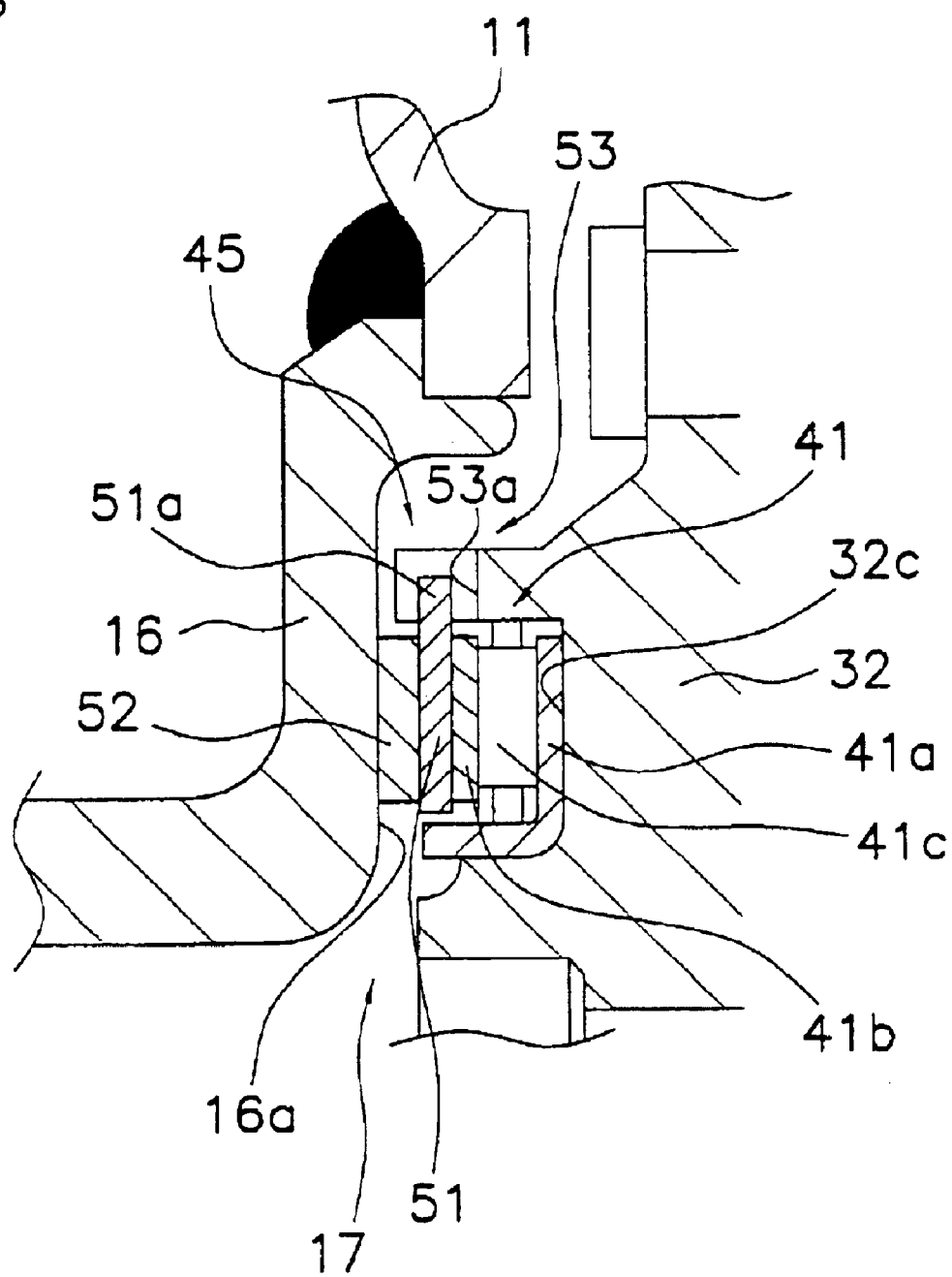
FIG. 2 is an enlarged partial view of FIG. 1 showing a vertical cross-sectional schematic view of a friction generating mechanism of the torque converter.

The friction generating mechanism 45 will be described below referring to FIG. 2. The friction generating mechanism 45 is a mechanism for generating friction resistance between the front cover 11, including the center boss 16, and the turbine 22 when they rotate relatively. The friction generating mechanism 45 is located in the axial direction between the center boss 16 and the turbine hub 32. The friction generating mechanism 45 is a mechanism for generating a predetermined amount of friction when two members make relative rotations due to torsional vibrations, but it is also constituted in such a way that it does not generate the above mentioned amount of friction resistance for torsional vibrations within a specified range of micro torsional angles.

The first thrust bearing 41 is a thrust needle bearing and abuts with a face 32c of the turbine hub 32 on the engine side in the axial direction. The first thrust bearing 41 is made of a first annular plate 41a, a second annular plate 41b, and multiple rolling members 41c. The first annular plate 41a axially abuts with the face 32c on the engine side. The second annular plate 41b is located axially apart from the engine side face. The multiple rolling members 41c are sandwiched between the plates 41a and 41b.

The friction generating mechanism 45 primarily is made of the friction plate 51 and the friction washer 52. The friction plate 51 is an annular member preferably made of sheet metal, and abuts with the second annular plate 41b of the thrust bearing 41. The friction washer 52 is an annular member made of a material of a relatively high friction coefficient. The friction washer 52 is sandwiched in the axial direction between a transmission side face 16a of the center boss 16 and the friction plate 51. As mentioned before, a load is applied between each of these plates 16 and 51 due to the hydraulic pressure in the fluid action chamber 6.

Figure 3:
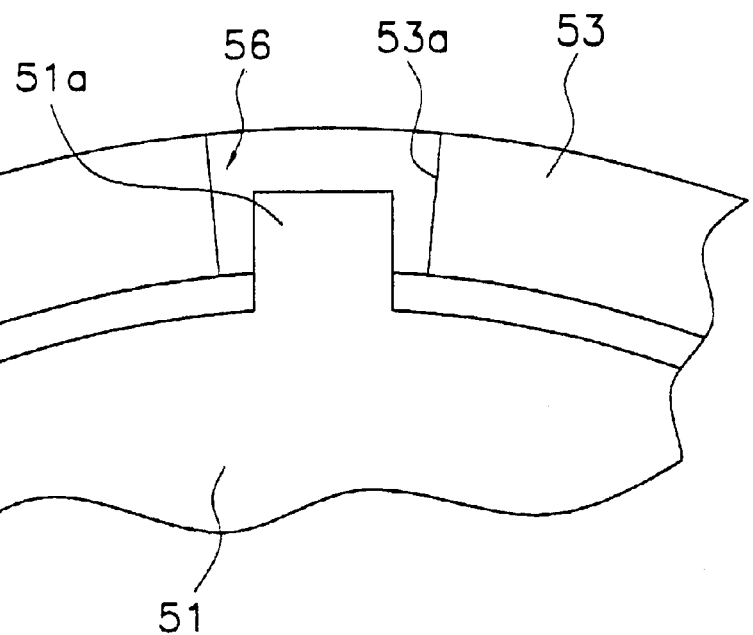
FIG. 3 is an elavational view of an engagement part between a friction plate and a turbine hub illustrating a micro torsional angle gap of the friction generating mechanism.

The engagement between the friction plate 51 and the turbine hub 32 will be described below. On the turbine hub 32, a cylindrical part 53 is formed that axially extends through the outer peripheral side of the thrust bearing 41 and the friction plate 51 and reaches to the vicinity of the center boss 16. Notches 53a are formed at the tip of cylindrical part 53. Each notch 53a forms a specified angle against the circumferential direction as can be seen from FIG. 3. Moreover, a plurality of prongs 51a is formed to protrude raidally outward on the outer periphery of the friction plate 51. Each of the prongs 51a is inserted into one notch 53a and this engagement secures the friction plate 51 to rotate together with the turbine hub 32. However, as it can be seen from FIG. 3, the circumferential length of the prong 51a is smaller than the circumferential length of the notch 53a. Thus, the prong 51a can move inside the notch 53a in the circumferential direction within a range of specified angles. The gap that exists between the prong 51a and the notch 53a in the rotation direction is designated as a micro torsional angle gap 56 and its circumferential angle is designated as $\theta_1$. Incidentally, the $\theta_1$ value is set in such a way as to achieve a reduction of booming sounds by preventing the torsional vibration due to rotational fluctuations of the engine from causing a high hysteresis torque, specifically, within the range of 0.5 to 5 degrees, or slightly above it.

Referring again to FIG. 2, the first port 17 preferably has radial grooves (not shown) extending radially on the axial transmission side face 16a of the center boss 16.

(4) Operation of the Torque Converter

Referring to FIG. 1, immediately after the engine is started, the hydraulic oil is supplied from the first port 17 and the third port 19 to torque converter main body 5, and the hydraulic oil is discharged from the second port 18. The hydraulic oil supplied from the first port 17 flows through the first hydraulic chamber A to its outer periphery side, and flows through the second hydraulic chamber B into the fluid operating chamber 6. Due to the difference in the hydraulic pressures of the first hydraulic chamber A and the second hydraulic chamber B, the piston 71 moves axially toward the engine side. In other words, the friction facing 76 is separated from the front cover 11, and the lockup is released under the circumstance.

Thus, when the lockup is released, the torque transmission between the front cover 11 and the turbine 22 is done through the fluid drive between the impeller 21 and the turbine 22.

(5) Operation of the Lockup Device

When the velocity ratio of the torque converter 1 increases and the input shaft 3 reaches a certain speed, the hydraulic oil in the first hydraulic chamber A is discharged through the first port 17. As a result, the piston 71 moves toward the front cover 11 due to the difference in the hydraulic pressures of the first hydraulic chamber A and the second hydraulic chamber B, and the friction facing 76 is pressed against the flat friction surface 11b of the front cover 11. As a result, the torque of the front cover 11 is transmitted from the piston 71 to the driven plate 73 via the drive plate 72 and the torsion springs 74. The torque is further transmitted from the driven plate 73 to the turbine 22. In other words, the front cover 11 is mechanically connected to the turbine 22, and the torque of the front cover 11 is outputted directly to the input shaft 3 via the turbine 22.

In the lockup connection state described in the above, the lockup device 7 not only transmits the torque but also absorbs and dampens torsional vibrations entering from the front cover 11. More specifically, when the torsional vibrations enter from the front cover 11 into the lockup device 7, the torsion springs 74 become compressed in the rotational direction between the drive plate 72 and the driven plate 73. More specifically, the torsion springs 74 become compressed between the drive plate 72 and the driven plate 73 in the rotational direction. At this time, the spring holder 75 moves in the rotational direction as it is pressed by the torsion springs 74, thus rotating relative to the drive plate 72 and the driven plate 73.

Figure 4:
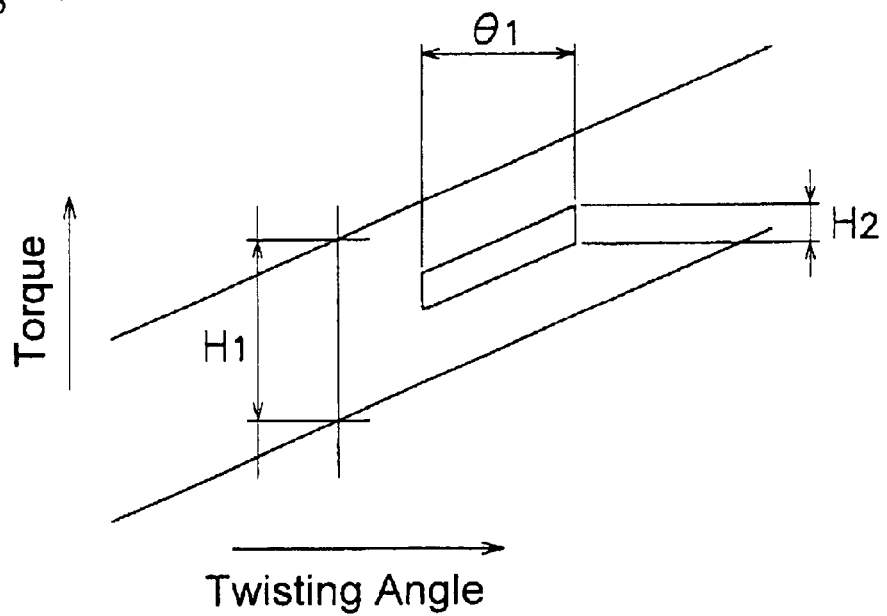
FIG. 4 is a diagrammatical view illustrating a portion of a torsional characteristic graph of a damper mechanism of a lockup device of the torque converter.

In the friction generating mechanism 45, the friction washer 52 slides between the center boss 16 and the friction plate 5 1. Therefore, a relatively high hysteresis torque $H_1$ is obtained as shown in the torsional characteristic chart of FIG. 4. Referring now to FIGS. 2 and 4, however, when micro torsional vibrations are inputted and if they are within $\theta_1$, the friction plate 51 rotates together with the friction washer 52 and rotates relative to the turbine hub 32. Although the friction plate 51 rotates relative to the turbine hub 32 during this operation, very little hysteresis torque develops between them as the thrust bearing 41 exists between them. In other words, the friction washer 52 does not rub against the members on both sides within $\theta_1$ so that it does not generate hysteresis torque.

It is possible to replace the thrust bearing with a washer with an extremely low friction coefficient. In such a case, when the friction plate 51 rotates relative to the turbine hub 32 as the micro torsional vibrations are inputted, a low hysteresis torque can be generated between them.

Thus, it is possible to absorb micro torsional vibrations by selecting either causing hysteresis torque at all or allowing very low hysteresis torque to be generated as needed without allowing the friction generating mechanism 45 to operate.

(6) Effect of the Friction Generating Mechanism

1) Effect of Torsional Characteristic

As mentioned before, if the type of torsional vibrations is such that they develop vibrations of large torsional angles as in the case of low frequency vibrations, the friction surface, i.e., the friction washer 52, utilizes rubbing actions to generate a high hysteresis torque. Thus, the low frequency vibrations are quickly attenuated. If the type of torsional vibrations is such that they develop vibrations of small torsional angles as in the case of engine rotation fluctuations which may be the cause of abnormal noise during driving, the friction washer 52 does not produce any rubbing actions due to the micro torsional angle gap 56. Therefore, the engine rotation fluctuations are absorbed sufficiently and no abnormal noise is emitted during driving.

2) Effect of Functional Position

Figure 5:
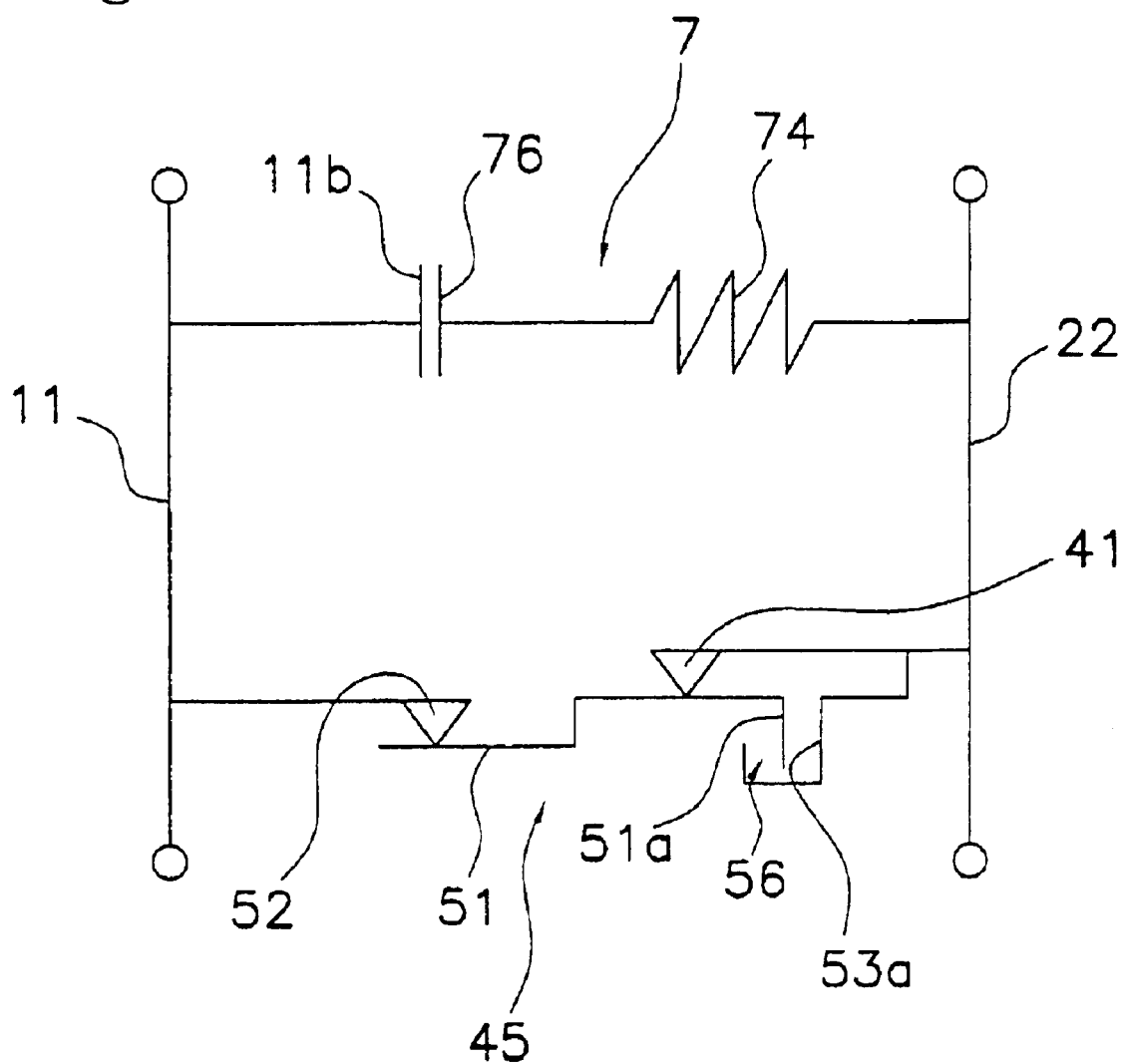
FIG. 5 is a view of a mechanical circuit diagram of the torque converter.

As shown in the mechanical circuit of FIG. 5, the friction generating mechanism 45 is provided to operate in the rotational direction between the front cover 11 and the turbine 22. In other words, the friction generating mechanism 45 is constituted in such a way that it operates in parallel with the torsion springs 74, which is the elastic connection mechanism of the lockup device 7, in other words, independent from the torsion springs 74, etc. Such a constitution provides a benefit of achieving a simpler constitution for the lockup device 7.

3) Effect of Structural Position a) The friction generating mechanism 45 is placed in the axial direction between the front cover inner periphery and the turbine hub 32. As a result, it is not necessary to provide a special space for the friction generating mechanism 45, thus, the present invention provides a space saving benefit.

b) The axial load for each plate in the friction generating mechanism 45 does not require any spring because it can be generated by means of the hydraulic pressure in the fluid action chamber 6. This means that no spring needs to be added and provides a benefit of minimizing the number of parts.

(7) Other Embodiments

Second Embodiment

Figure 6:
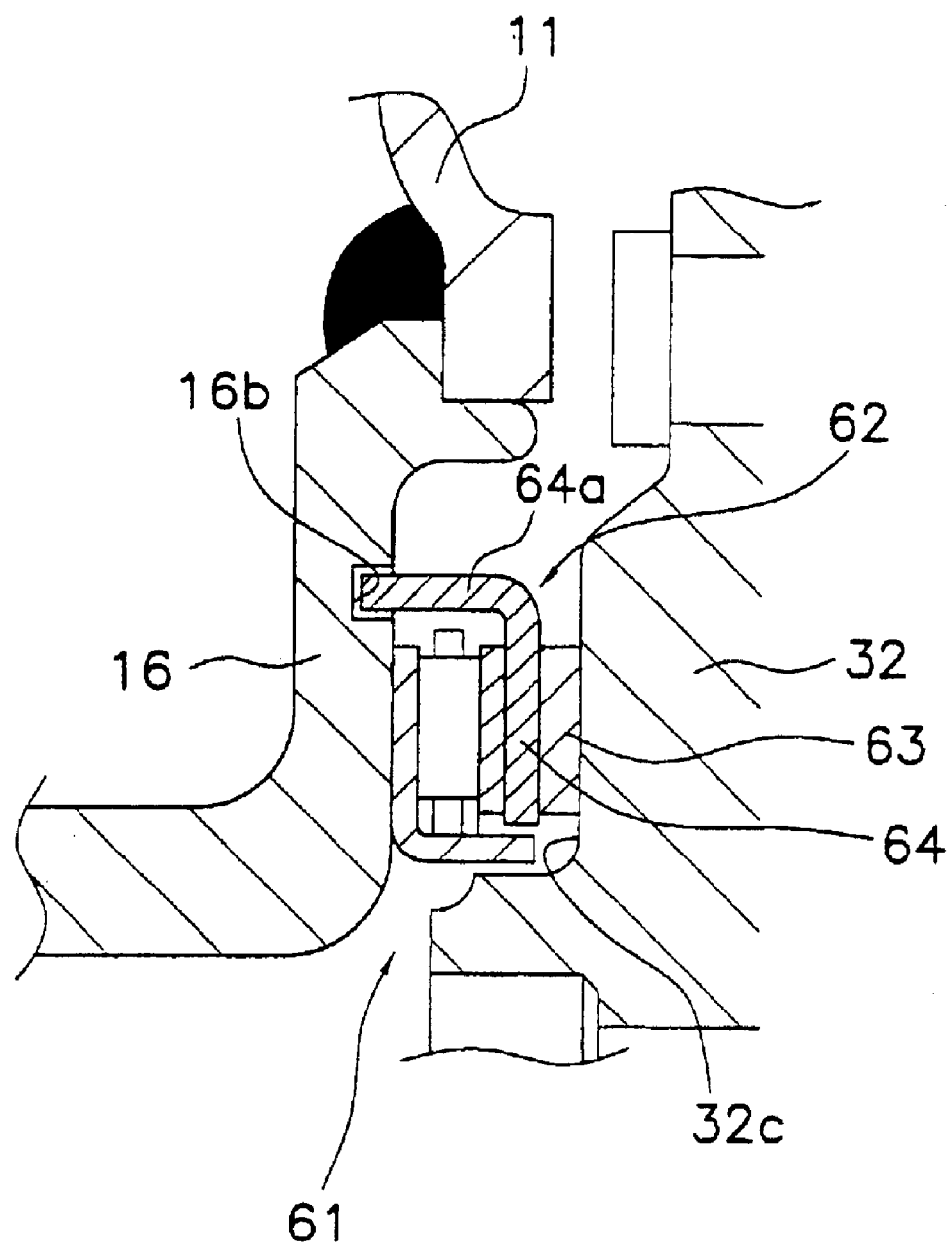
FIG. 6 is a view corresponding to FIG. 2 illustrating a vertical cross-sectional schematic view of a friction generating mechanism in accordance with an alternate embodiment of the present invention.

Referring now to FIG. 6, a fluid torque transmission device equipped with a lockup device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 7:
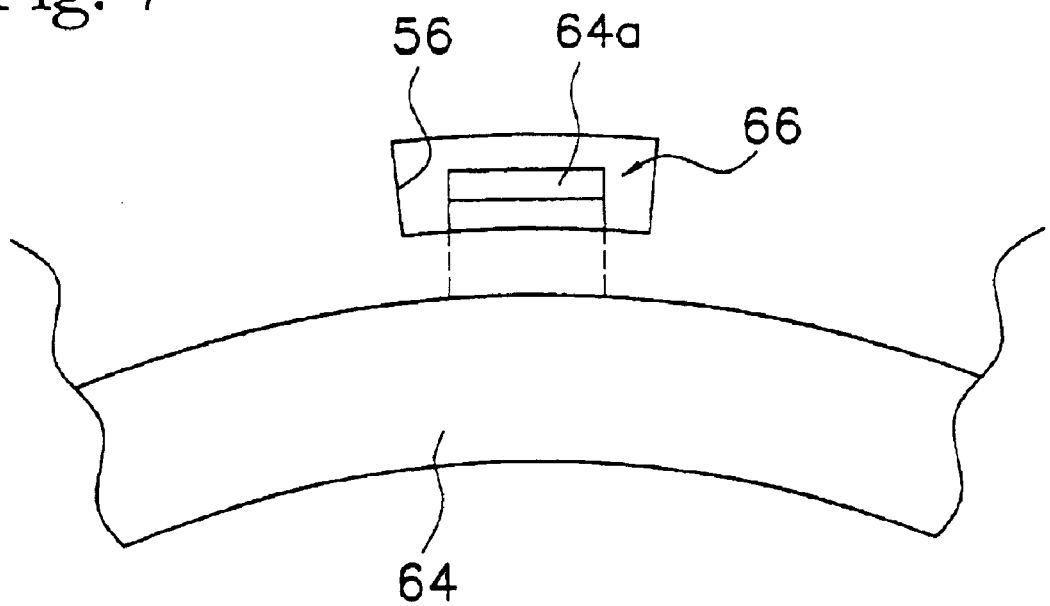
FIG. 7 is a view corresponding to FIG. 3 illustrating an elevational view of an engagement part between the friction plate and the turbine hub illustrating a micro torsional angle gap of the friction generating mechanism in accordance with the alternate embodiment of the present invention.

1) In an alternate preferred embodiment of the present invention shown in FIG. 6, a thrust bearing 61 is provided on the side of the center boss 16, so that friction generating mechanism 62 is placed on the side of the turbine hub 32. As a consequence, a friction washer 63 of the friction generating mechanism 62 abuts with the face 32c of the turbine hub 32 on the engine side in the axial direction. The friction plate 64 of the friction generating mechanism 62 has multiple prongs 64a, which extend from its outer periphery on the transmission side in the axial direction. The prongs 64a extend on the outer periphery side of the thrust bearing 61 and their tips are inserted into the holes 16b formed on the face 16a of the center boss 16 on the transmission side in the axial direction. As a result of this engagement, the friction plate 64 rotates together with the front cover 11, etc. Similar to the previous embodiment, a micro torsional angle gap 66 is provided in the circumferential direction between the prongs 64a and the holes 16b as shown in FIG. 7.

2) Alternatively, another embodiment would allow the friction plate and the friction washer to be fastened with each other or be made on an integral plate material.

3) The structure of the engagement part between the friction plate and other members via the micro torsional angle gap is not limited by the format of aforementioned embodiments. For example, the relation between a prong and a notch can be reversed.

4) The structure of the lockup device is not limited by the format of the above-mentioned embodiments. For example, the present invention can be applied to a lockup device having a multiple plate clutch wherein the multiple plates are placed between the piston and the front cover. The present invention can be applied to a lockup device wherein drive plates are provided on both sides of driven plate in the axial direction as in the case of a clutch disk assembly member.

5) The present invention can be applied not only to torque converters, but also to other fluid torque transmission devices with lockup devices such as a fluid coupling.

EFFECT OF THE INVENTION

The torque converter with a lockup device according to the present invention can generate appropriate hysteresis torque depending on the type of torsional vibration, so that it provides an improved vibration reduction function.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-396532. The entire disclosure of Japanese Patent Application No. 2001-396532 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fluid torque transmission device comprising:
   a front cover;
   an impeller being arranged with said front cover to form a fluid chamber;
   a turbine being arranged to oppose said impeller in an axial direction inside said fluid chamber;
   a lockup device being configured to connect and disconnect mechanically said front cover and said turbine, said lockup device having a clutch mechanism and an elastic connection mechanism; and
   a friction generating mechanism being configured to generate friction resistance during operation of said lockup device, said friction generating mechanism having a friction surface and a micro gap, said micro gap being configured to prevent said friction surface from operating within a range of micro twisting angles.

2. The fluid torque transmission device according to claim 1, wherein said friction generating mechanism is arranged to operate in parallel with said elastic connection mechanism of said lockup device between said front cover and said turbine.

3. The fluid torque transmission device according to claim 2, wherein
   said turbine comprises a turbine shell, multiple turbine blades provided on an impeller side surface of said turbine shell, and a turbine hub affixed to said turbine shell's inner periphery; and
   said friction generating mechanism is arranged in said axial direction between an inner periphery of said front cover and said turbine hub.

4. The fluid torque transmission device according to claim 3, wherein said friction generating mechanism comprises an engagement part that engages with either one of said front cover or said turbine hub across said micro gap in the rotating direction, and said friction surface is arranged between said engagement part and an other one of said front cover or said turbine hub.

5. The fluid torque transmission device according to claim 4 further comprising,
   a thrust bearing being arranged in the axial direction between said friction generating mechanism and said either one of said front cover or said turbine hub.

6. The fluid torque transmission device according to claim 4, wherein
   said friction generating mechanism generates a first friction smaller than a second friction generated by said friction surface in order to dampen the vibrations of said micro twisting angles within said range of micro twisting angles.

7. The fluid torque transmission device according to claim 3, wherein
   said friction generating mechanism generates a first friction smaller than a second friction generated by said friction surface in order to dampen the vibrations of said micro twisting angles within said range of micro twisting angles.

8. The fluid torque transmission device according to claim 2, wherein
   said friction generating mechanism generates a first friction smaller than a second friction generated by said friction surface in order to dampen the vibrations of said micro twisting angles within said range of micro twisting angles.

9. The fluid torque transmission device according to claim 1, wherein
   said friction generating mechanism generates a first friction smaller than a second friction generated by said friction surface in order to dampen the vibrations of said micro twisting angles within said range of micro twisting angles.

10. The fluid torque transmission device according to claim 9, wherein
    said friction generating mechanism comprises a friction plate and a friction washer.

11. The fluid torque transmission device according to claim 10, wherein
    said friction generating mechanism is arranged between said front cover and said turbine.

12. The fluid torque transmission device according to claim 1, wherein
    said micro gap is between 0.5 and 6 degrees.

13. A torque converter comprising:
    a front cover;
    an impeller being configured to rotate integrally with said front cover;
    a turbine being arranged to oppose axially said impeller, and being arranged axially between said impeller and said front cover;
    a lockup device being arranged to connect and disconnect said turbine and said front cover; and
    a friction generating mechanism being configured to generate friction resistance during operation of said lockup device, said friction generating mechanism having a friction surface and a micro gap, said micro gap being configured to prevent said friction surface from operating within a range of micro twisting angles, said friction generating mechanism being arranged between said front cover and said turbine.

14. The torque converter according to claim 13, wherein
    said friction generating mechanism comprises a friction plate and a friction washer.

15. The torque converter according to claim 14, wherein said turbine comprises a cylindrical part that extends in an axial direction, said cylindrical part has at least one notch having a first circumferential length, and said friction plate has at least one prong having a second circumferential length, said prong is configured to fit inside said notch and said first circumferential length is larger than said second circumferential length.

16. The torque converter according to claim 15, further comprising,
    a thrust bearing being arranged in the axial direction between said friction generating mechanism and said turbine hub.

17. The torque converter according to claim 13, wherein said micro gap is between 0.5 and 6 degrees.

18. The torque converter according to claim 14, wherein said front cover has at least one notch having a first circumferential length, and said friction plate has at least one prong having a second circumferential length, said prong is configured to fit inside said notch and said first circumferential length is larger than said second circumferential length.

19. The torque converter according to claim 18, further comprising, a thrust bearing being arranged in the axial direction between said friction generating mechanism and said turbine hub.

* * * * *